US011751186B2

(12) United States Patent
Sakhnini et al.

(10) Patent No.: US 11,751,186 B2
(45) Date of Patent: Sep. 5, 2023

(54) SINGLE LAYER UPLINK NON-CODEBOOK BASED PRECODING OPTIMIZATION

(71) Applicant: QUALCOMM Incorporated, San Diego, CA (US)

(72) Inventors: Iyab Issam Sakhnini, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 27 days.

(21) Appl. No.: 17/323,970

(22) Filed: May 18, 2021

(65) Prior Publication Data

US 2022/0030576 A1 Jan. 27, 2022

Related U.S. Application Data

(60) Provisional application No. 63/054,724, filed on Jul. 21, 2020.

(51) Int. Cl.
*H04W 4/00* (2018.01)
*H04W 72/044* (2023.01)
*H04W 24/08* (2009.01)

(52) U.S. Cl.
CPC ......... *H04W 72/046* (2013.01); *H04W 24/08* (2013.01)

(58) Field of Classification Search
CPC ... H04W 72/046; H04W 24/08; H04W 48/16; H04L 5/0007; H04L 5/0048; H04L 5/005; H04L 5/0053; H04B 7/0695
USPC .................................. 370/329–330, 335–345
See application file for complete search history.

(56) References Cited

U.S. PATENT DOCUMENTS

| 2020/0053724 | A1* | 2/2020 | MolavianJazi | H04W 52/34 |
|---|---|---|---|---|
| 2021/0184819 | A1* | 6/2021 | Takeda | H04L 5/0057 |
| 2021/0219246 | A1* | 7/2021 | Xu | H04L 1/1819 |
| 2022/0070855 | A1* | 3/2022 | Zhang | H04W 72/042 |

(Continued)

FOREIGN PATENT DOCUMENTS

| CA | 3048933 A1 * | 7/2018 | ........ H04B 7/0417 |
|---|---|---|---|
| EP | 3681055 A1 | 7/2020 | |
| WO | 2020044409 A1 | 3/2020 | |

(Continued)

OTHER PUBLICATIONS

International Search Report and Written Opinion—PCT/US2021/033920—ISA/EPO—dated Aug. 31, 2021.

*Primary Examiner* — Thai D Hoang
(74) *Attorney, Agent, or Firm* — Procopio, Cory, Hargreaves & Savitch

(57) ABSTRACT

A configuration to reduce a timeline for non-codebook based uplink precoding procedures. The apparatus measures an NZP-CSI-RS over one or more beams from a base station. The apparatus determines a single beam for communication with the base station based on measurement of the NZP-CSI-RS. The apparatus transmits a PUSCH using the single beam and based on determining the single beam for communication with the base station. The apparatus may receive a configuration from the base station to perform a SRS-less non-codebook based uplink precoding procedure. The UE may transmit the PUSCH using the single beam and without transmitting an SRS further based on the configuration from the base station. The apparatus may skip transmission of an SRS between measurement of the NZP-CSI-RS and transmission of the PUSCH.

30 Claims, 12 Drawing Sheets

(56) References Cited

U.S. PATENT DOCUMENTS

2022/0190902 A1\* 6/2022 Zhang ................ H04W 56/001

FOREIGN PATENT DOCUMENTS

| WO | WO-2021028059 A1 \* | 2/2021 | ........... H04B 7/0617 |
| WO | WO-2021161223 A1 \* | 8/2021 | |

\* cited by examiner

SINGLE LAYER UPLINK NON-CODEBOOK BASED PRECODING OPTIMIZATION

CROSS REFERENCE TO RELATED APPLICATION(S)

This application claims the benefit of and priority to U.S. Provisional Application Ser. No. 63/054,724, entitled "Single Layer Uplink Non-Codebook based Precoding Optimization" and filed on Jul. 21, 2020, which is expressly incorporated by reference herein in its entirety.

TECHNICAL FIELD

The present disclosure relates generally to communication systems, and more particularly, to a configuration for single layer uplink non-codebook based precoding.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a device at a UE. The device may be a processor and/or a modem at a UE or the UE itself. The apparatus measures a non-zero-power channel state information reference signal (NZP-CSI-RS) over one or more beams from a base station. The apparatus determines a single beam for communication with the base station based on measurement of the NZP-CSI-RS. The apparatus transmits a physical uplink shared channel (PUSCH) using the single beam and based on the UE determining the single beam for communication with the base station.

In an aspect of the disclosure, a method, a computer-readable medium, and an apparatus are provided. The apparatus may be a device at a base station. The device may be a processor and/or a modem at a base station or the base station itself. The apparatus transmits a non-zero-power channel state information reference signal (NZP-CSI-RS) over one or more beams from a base station. The apparatus skipping transmission of a scheduling request indicator (SRI) to a user equipment (UE). The apparatus receiving a physical uplink shared channel (PUSCH) on a single beam from the UE.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
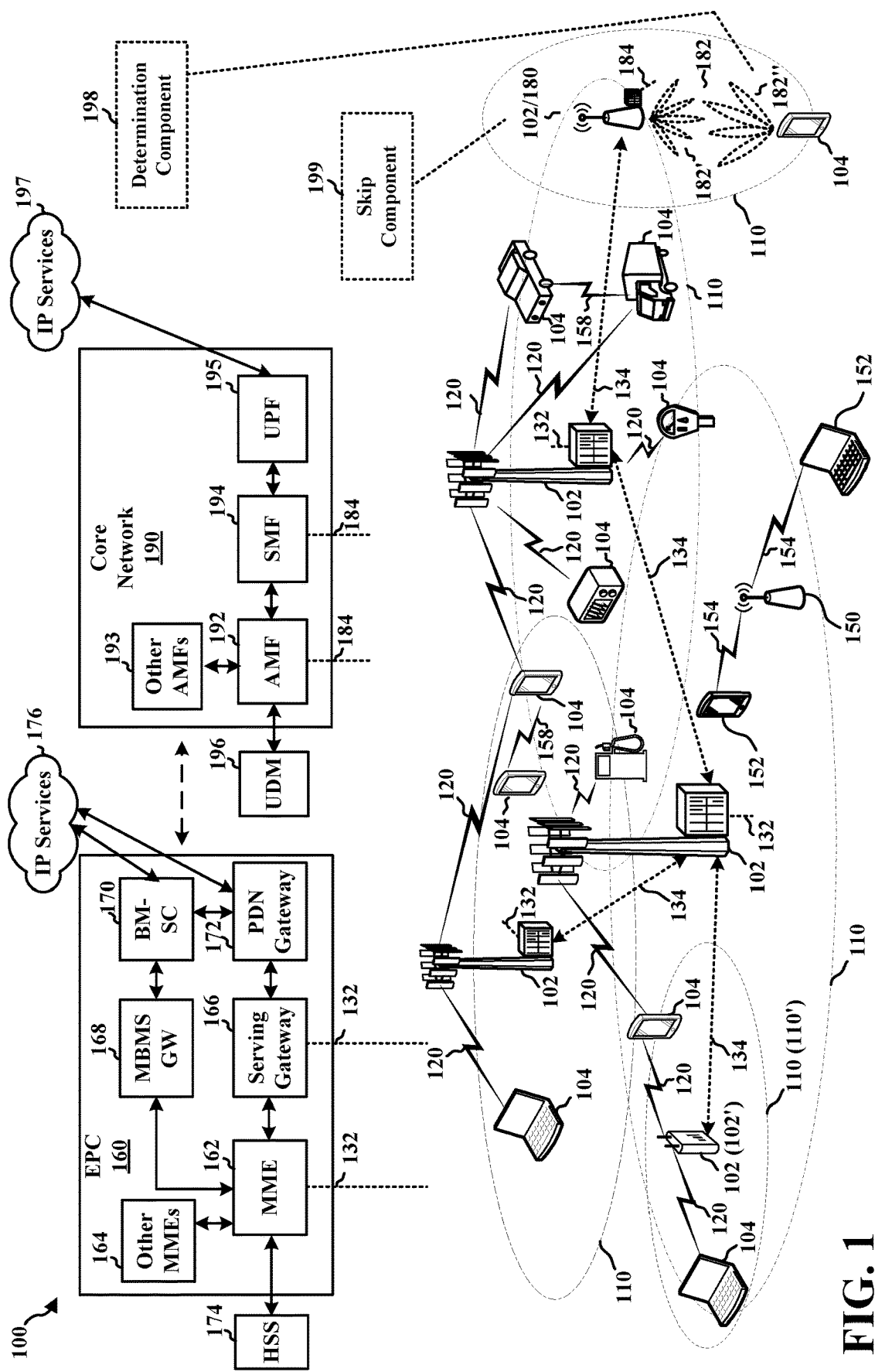
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may be configured to reduce a timeline for non-codebook based uplink precoding procedures. For example, the UE 104 may comprise a determination component 198 configured to determine a single beam for communication with the base station 180. The UE 104 measures an NZP-CSI-RS over one or more beams from a base station. The UE 104 determines the single beam for communication with the base station based on measurement of the NZP-CSI-RS. The UE 104 transmits a PUSCH using the single beam and based on the UE 104 determining the single beam for communication with the base station 180.

Referring again to FIG. 1, in certain aspects, the base station 180 may be configured to configure a UE 104 to reduce a timeline for non-codebook based uplink precoding procedures. For example, the base station 180 may comprise a skip component 199 configured to skip transmission of an SRI. The base station 180 transmits an NZP-CSI-RS over one or more beams. The base station 180 skips transmission of the SRI to the UE 104. The base station 180 receives a PUSCH on a single beam from the UE 104.

Although the following description may be focused on 5G NR, the concepts described herein may be applicable to other similar areas, such as LTE, LTE-A, CDMA, GSM, and other wireless technologies.

Figure 2:
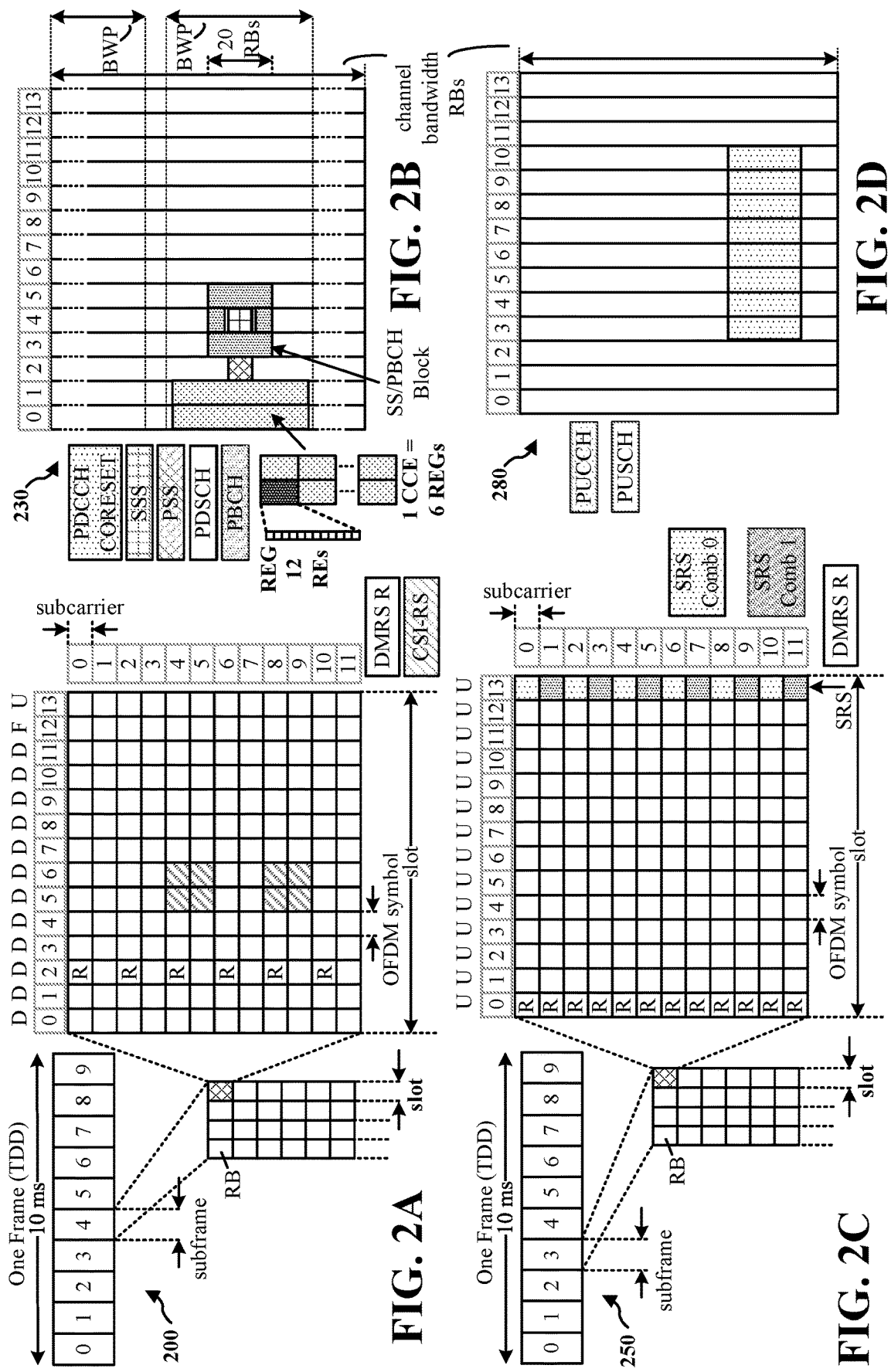
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS<br>$\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies μ0 to 4 allow for 1, 2, 4, 8, and 16 slots, respectively, per subframe. For extended CP, the numerology 2 allows for 4 slots per subframe. Accordingly, for normal CP and numerology p, there are 14 symbols/slot and $2^\mu$ slots/subframe. The subcarrier spacing may be equal to $2^\mu$ *15 kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 s. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
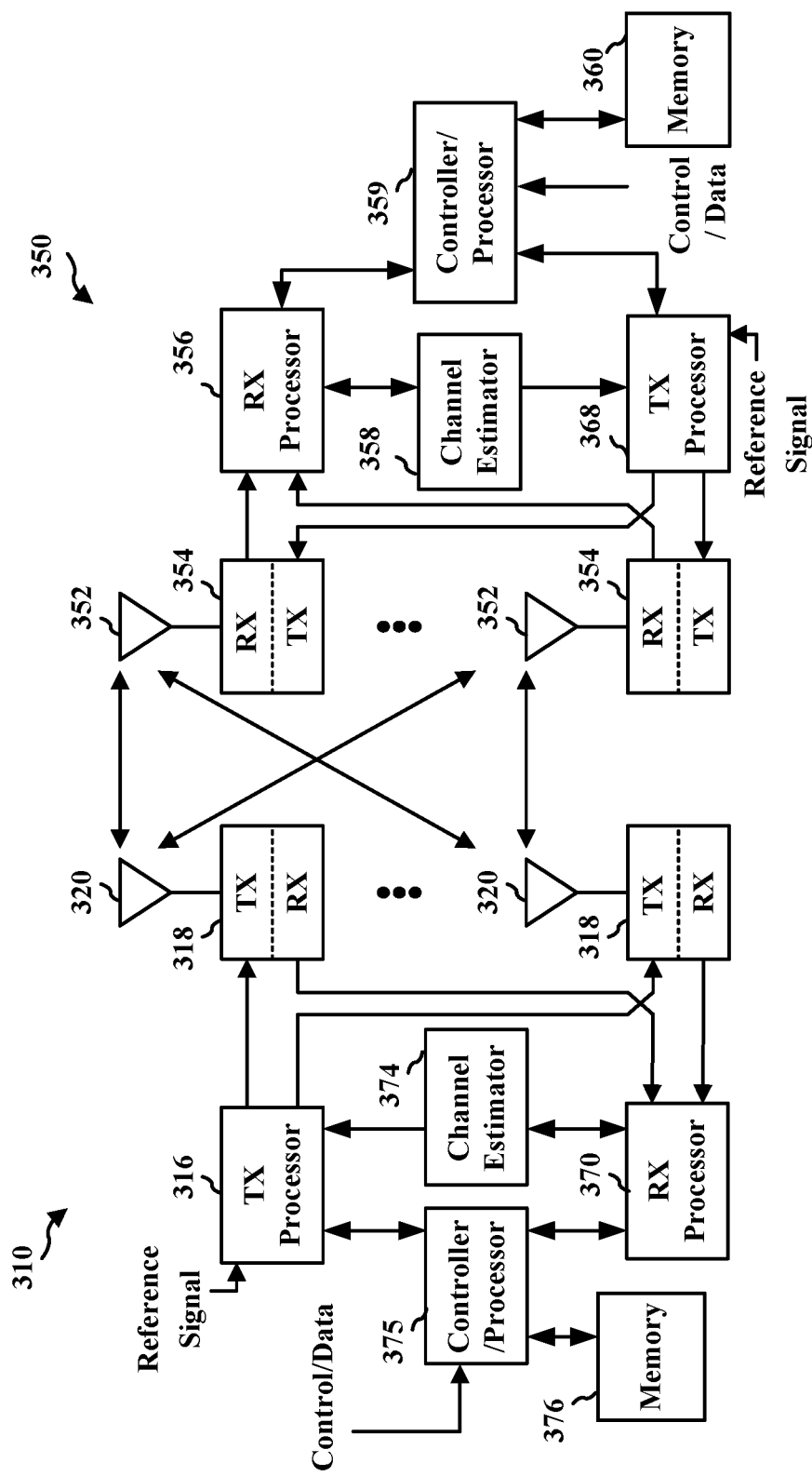
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting;

PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each sub-carrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 198 of FIG. 1.

Uplink precoding may be codebook and non-codebook based. For example, a procedure for non-codebook based uplink precoding may include an SRS associated with an NZP-CSI-RS resources set. A UE may estimate a precoder based on its measurement of the NZP-CSI-RS. A channel reciprocity may be assumed between the UE and the network. In some instances, such as but not limited to aperiodic CSI-RS, a number of slot between a triggering DCI and a slot containing the CSI-RS may be semi-statically configured (e.g., via RRC) using a parameter aperiodicTriggeringOffset, which may comprise 0-31 slots. The UE may select a precoder which may comprise multiple beams, which may correspond to multiple possible layers. The UE may send multiple SRSs (e.g., one for each of the precoder beams). In some instances, such as for aperiodic triggering, there may be a minimum of a 42 symbol delay between the NZP-CSI-RS and the SRS.

The network may measure the SRSs sent by the UE, and may select a subset. The measurement of the NZP-CSI-RS by the UE is performed on downlink signals, which may not be the optimal selection for an uplink transmission. The network may send an uplink grant to the UE with an SRI that indicates the subset of beams that the UE may use for the uplink transmission. The uplink grant may implicitly indicate the number of layers. The UE may send a PUSCH on beams/layers that are indicated by the SRI. The UE may send the PUSCH after a scheduling delay from the network.

Figure 4:
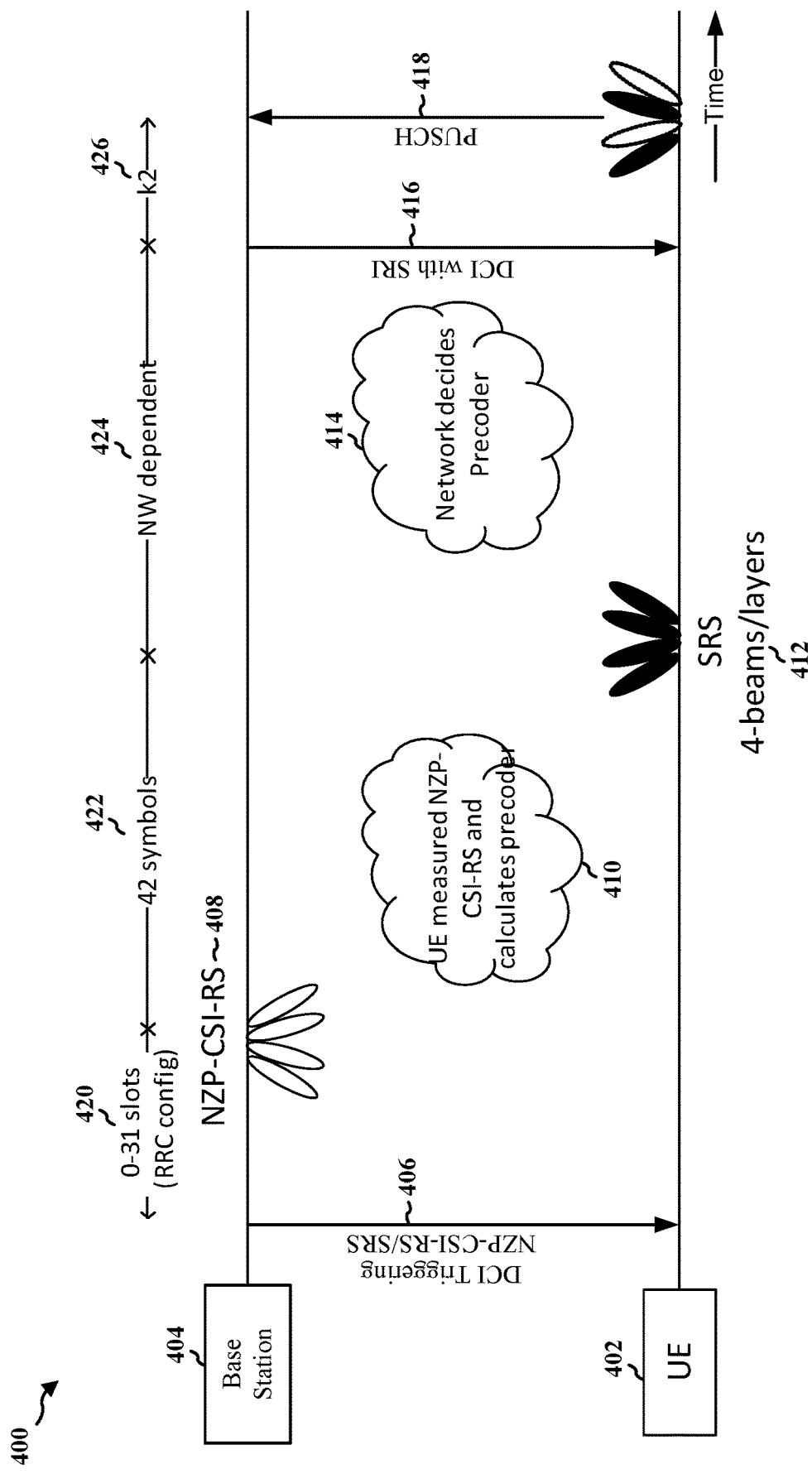
FIG. 4 is a diagram illustrating an example of non-codebook based uplink precoding procedure.

FIG. 4 is a diagram 400 illustrating an example of non-codebook based uplink precoding procedure. The diagram 400 of FIG. 4 includes an example of non-codebook based uplink precoding procedure for aperiodic triggering. The diagram 400 includes a UE 402 and a base station 404. The base station 404 may send a DCI 406, which may trigger a NZP-CSI-RS or SRS measurement at the UE 402. The base station 404 may transmit the NZP-CSI-RS 408 to the UE 402 after transmitting the DCI triggering the measurement by the UE. A delay 420 may occur between the DCI triggering 406 and the transmission of the NZP-CSI-RS 408. The delay may provide time for the UE to receive the DCI and prepare to measure the NZP-CSI-RS. The delay 420 may comprise 0-31 slots, which may be based on an RRC configuration. After the transmission of the NZP-CSI-RS 408, the UE, at 410, may calculate a precoder based on the measured NZP-CSI-RS. After determining the precoder(s), the UE 402 may transmit multiple SRS 412 (e.g., one for each of the precoder beams) to the base station 404. A delay is illustrated between the transmission of the NZP-CSI-RS of the base station and the transmission of the SRS by the UE. The delay may be based on the processing time for the UE to calculate the precoder and prepare to transmit the SRS. The delay 422 between the transmission of the NZP-CSI-RS 408 from the base station 404 and the transmission of the SRS 412 from the UE 402 may comprise, e.g., 42 symbols. The base station 404, at 414, may measure the SRS 412 sent from the UE 402 and may select a subset of beams, e.g., select a precoder. The base station 404 may transmit a DCI 416 having an SRI that indicates the selected beam to the UE. A network dependent delay 424 may be present between the transmission of the SRS 412 from the UE and the transmission of the DCI 416. The delay may be based on processing time for the base station to make a determination based on the SRS and to prepare to transmit the SRI. The UE 402, upon receipt of the DCI 416 may use the SRI to transmit a PUSCH 418 to the base station 404. The UE 402 may transmit the PUSCH on the beams/layers indicated by the SRI within the DCI 416. A delay k2 426 may be present between the UE's reception of the DCI 416 and the transmission of the PUSCH 418. The time delay may provide time for the UE to receive the SRI, determine the indicated beams or precoder, and prepare to transmit the PUSCH with the indicated beams or precoder.

In some instances, a UE measurement of the NZP-CSI-RS may result in only one beam in the precoder. However, the UE would still go through the process discussed above, despite the UE only sending one SRS and get the SRI corresponding to the SRS. Since the UE only has one beam/layer, the UE sending the SRS (e.g., 412) and the network measuring the sent SRS (e.g., 414) unnecessarily increase the precoding timeline, and may not be needed. Aspects presented herein improve the efficiency of uplink or downlink transmission that may reduce the precoding timeline.

Aspects presented herein improve the manner of configuring an uplink precoding procedure. For example, a UE may determine that only one beam is possible in a precoder, based on a measurement of a NZP-CSI-RS. In such instances, the UE may transmit to a base station a PUSCH using the one beam, and may skip the steps of sending an SRS transmission to the base station and receiving from the base station a DCI having an SRI that identifies the one beam already determined by the UE. The UE may reduce the delay or timeline of the precoding procedure by skipping one or more steps of the precoding procedure when a single precoder is identified by the UE based on the measurement of the NZP-CSI-RS from the base station.

Figure 5:
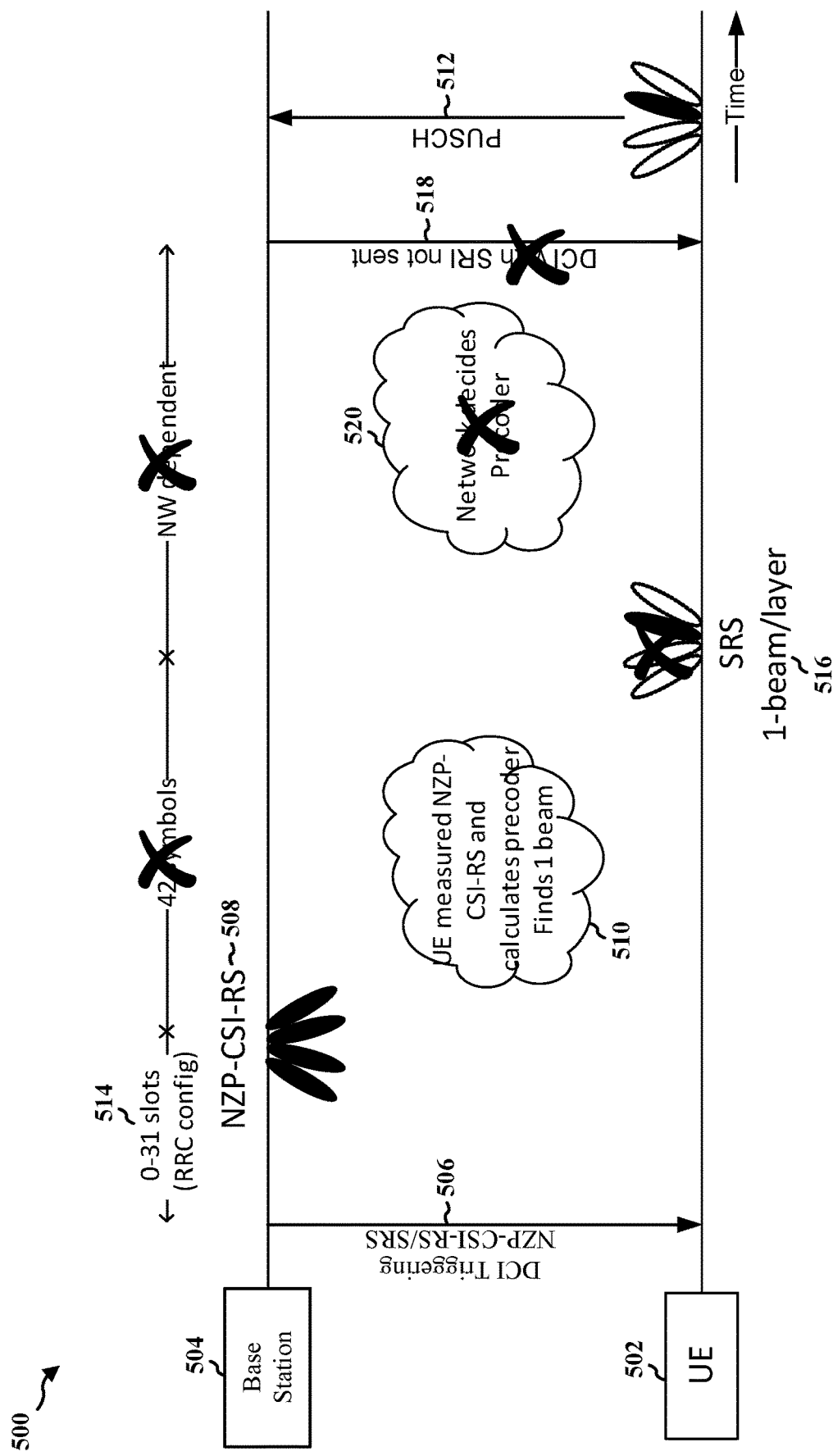
FIG. 5 is a diagram illustrating an example of non-codebook based uplink precoding procedure.

FIG. 5 is a diagram 500 illustrating an example of non-codebook based uplink precoding procedure in which the UE identifies a single beam based on measurements of the NZP CSI-RS from the base station. The diagram 500 includes a UE 502 and a base station 504. The base station 504 may transmit a DCI 506 which may trigger the UE to measure a NZP-CSI-RS or SRS. The base station 504 may then transmit the NZP-CSI-RS 508. The UE 502, at 510, may measure the NZP-CSI-RS 508 and may determine that only one beam is possible in the precoder. However, in contrast to the diagram 400 of FIG. 4, the UE 502 may skip sending an SRS to the base station, such that the base station 504 does not measure the SRS from the UE 502 and does not transmit a DCI with an SRI. Instead, the UE may transmit the PUSCH 512 to the base station 504 using the one beam identified by the UE. The base station 504 may determine that a single beam (e.g., only one beam) was determined by the UE 502 by not detecting an SRS from the UE in the preconfigured resources. As such, the base station 504 may skip transmitting the DCI having the SRI.

By sending the PUSCH 512 without SRS transmission, due to determining that only one beam is possible, the UE may eliminate unnecessary steps and reduce the precoding timeline. The UE and the base station may also reduce signaling (e.g., the SRS and SRI transmissions) and improve the efficient use of wireless resources. The precoding timeline may be reduced due to eliminating the delay between the transmission of the NZP-CSI-RS 508 and the transmission of the SRS from the UE. This may eliminate a delay of 42 symbols. In addition, the precoding timeline may be further reduced due to eliminating the network delay between the transmission of the SRS from the UE 502 and the transmission of the DCI from the base station 504. A delay may be present between the transmission of the NZP-CSI-RS 508 and the transmission of the PUSCH 512. However, in some aspects, there may not be a delay between the transmission of the NZP-CSI-RS 508 and the transmission of the PUSCH 512 due to the UE being preconfigured with resources to transmit the PUSCH by the DCI 506 triggering the NZP-CSI-RS and SRS. In some aspects, the UE may be preconfigured with resources to transmit the PUSCH in a configured grant (CG) occasion.

In some aspects, the base station 504 may configure the UE 502 to perform an SRS-less non-codebook based uplink precoding procedure, such as, in instances where the network knows that the channel of the UE will not yield more than 1 beam/layer (e.g., reduced capacity UEs). For example, the base station 504 may transmit a configuration to the UE 502 to perform the SRS-less non-codebook based uplink precoding procedure, such that the base station 504 may receive the PUSCH 512 using a single beam and without receiving an SRS based on the configuration. In some aspects, the base station 504 may resume non-codebook based uplink precoding procedures with SRS. For example, the base station 504 may transmit a second configuration to the UE to apply a non-codebook based uplink precoding procedure with SRS transmission. The base station 504 may monitor for the SRS from the UE prior to receiving the PUSCH based on the second configuration.

In some aspects, the UE 502 may request to perform the SRS-less non-codebook based uplink precoding procedure, such as, in instances where the UE knows that the channel may be static (e.g., stationary UE) and conditions may not yield more than one beam/layer. For example, the UE 502 may transmit a request to perform the SRS-less non-codebook based uplink precoding procedure, such that the UE transmit the PUSCH 512 using the single beam and without transmitting an SRS based on the request. In some aspects, the UE may request to resume non-codebook based uplink precoding procedure with SRS. For example, the UE 502 may transmit a second request to apply a non-codebook based uplink precoding procedure with SRS transmission. The UE 502 may transmit the SRS prior to transmitting the PUSCH 512 after sending the second request.

Figure 6:
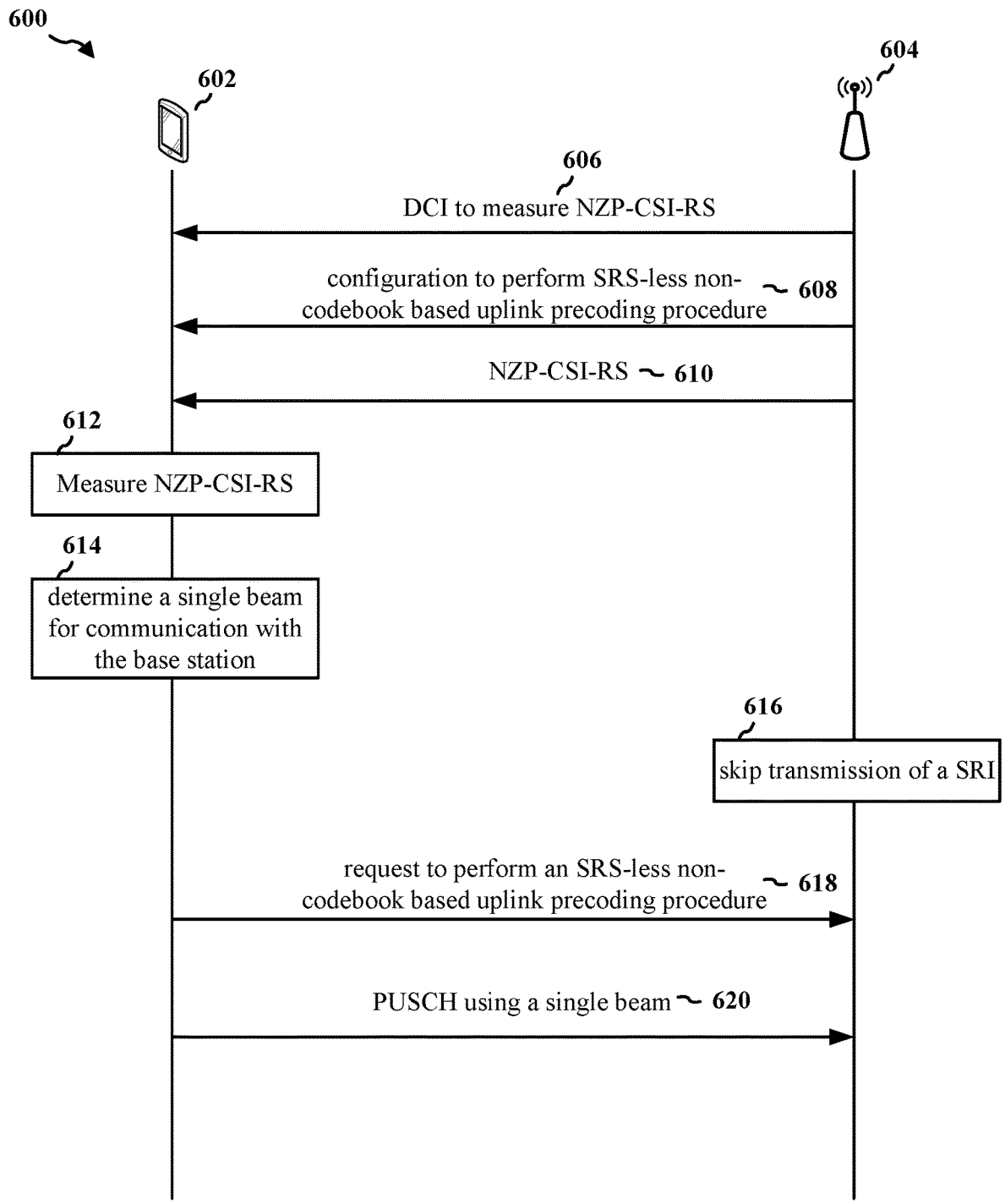
FIG. 6 is a call flow diagram of signaling between a UE and a base station in accordance with certain aspects of the disclosure.

FIG. 6 is a call flow diagram 600 of signaling between a UE 602 and a base station 604. The base station 604 may be configured to provide at least one cell. The UE 602 may be configured to communicate with the base station 604. For example, in the context of FIG. 1, the base station 604 may correspond to base station 102/180 and, accordingly, the cell may include a geographic coverage area 110 in which communication coverage is provided and/or small cell 102' having a coverage area 110'. Further, a UE 602 may correspond to at least UE 104. In another example, in the context of FIG. 3, the base station 604 may correspond to base station 310 and the UE 602 may correspond to UE 350.

As illustrated at 606, the base station 604 may transmit DCI indicating the UE to measure an NZP-CSI-RS. The UE 602 may receive the DCI from the base station 604. The base station 604 may transmit the DCI indicating the UE 602 to measure the NZP-CSI-RS prior to transmitting the NZP-CSI-RS. The UE 602 may be configured to transmit a PUSCH using resources configured in the DCI. The base station 604 may receive a PUSCH using resources configured in the DCI.

As illustrated at 608, the base station 604 may transmit a configuration to perform an SRS-less non-codebook based uplink precoding procedure. The UE 602 may receive the configuration from the base station 604. The base station 604 may transmit the configuration to perform the SRS-less non-codebook based uplink precoding procedure to a UE. The UE 602 may transmit a PUSCH using a single beam and without transmitting an SRS further based on the configuration from the base station 604. The base station 604 may receive the PUSCH using the single beam and without receiving an SRS based on the configuration. In some aspects, the base station 604 may transmit a second configuration for the UE 602 to apply a non-codebook based uplink precoding procedure with SRS transmission. In some aspects, the UE 602 may transmit the SRS prior to transmitting the PUSCH based on the second configuration. In some aspects, the base station 604 may monitor for the SRS from the UE 602 prior to receiving the PUSCH based on the second configuration.

As illustrated at 610, the base station may transmit the NZP-CSI-RS. The base station 604 may transmit the NZP-CSI-RS over one or more beams. The base station 604 may transmit the NZP-CSI-RS to the UE 602. The UE 602 may receive the NZP-CSI-RS from the base station 604.

As illustrated at 612, the UE 602 may measure the NZP-CSI-RS. The UE 602 may measure the NZP-CSI-RS over one or more beams from the base station 604. Measurements of the NZP-CSI-RS may indicate that a single beam meets criteria for communication with the base station 604.

As illustrated at 614, the UE 602 may determine the single beam for communication with the base station. The UE 602 may determine the single beam for communication with the base station 604 based on measurement of the NZP-CSI-RS. In some aspects, the UE 602 may determine the single beam for a non-codebook based precoder.

In some aspects, if the UE 602 identifies multiple potential beams based on the NZP-CSI-RS, the UE 602 may transmit an SRS using the multiple potential beams. The UE 602 may receive an SRI from the base station 604 indicating one or more beams. The UE 602 may transmit the PUSCH to the base station 604 using the one or more beams indicated in the SRI.

As illustrated at 616, the base station 604 may skip transmission of an SRI. The base station 604 may skip transmission of the SRI to the UE 602. In some aspects, the base station 604 may determine that an SRS is not received from the UE 602. The base station 604 may skip the transmission of the SRI based on determining that the SRS is not received from the UE 602.

As illustrated at 618, the UE 602 may transmit a request to perform an SRS-less non-codebook based uplink precoding procedure. The UE 602 may transmit the request to perform the SRS-less non-codebook based uplink precoding procedure to the base station 604. The base station 604 may receive the request from the UE 602. The UE 602 may transmit the PUSCH using the single beam and without transmitting an SRS further based on the request. The base station 604 may receive the PUSCH using the single beam and without monitoring for an SRS based on the request. In some aspects, the UE 602 may transmit the second request to apply a non-codebook based uplink precoding procedure with SRS transmission. The UE 602 may transmit the second request to the base station 604, and the base station 604 may receive the second request. In some aspects, the UE 602 may transmit the SRS prior to transmitting the PUSCH after sending the second request. In some aspects, the base station 604 may monitor for the SRS prior to receiving the PUSCH based on the second request.

As illustrated at 620, the UE 602 may transmit the PUSCH using the single beam. The UE 602 may transmit the PUSCH using the single beam to the base station 604. The base station 604 may receive the PUSCH on the single beam from the UE 602. The UE 602 may transmit the PUSCH using the single beam based on the UE 602 determining the single beam for communication with the base station. In some aspects, the UE 602 may transmit the PUSCH using resources in a CG occasion. In some aspects, the PUSCH may be received by the base station 604 based on a non-codebook based precoder.

Figure 7:
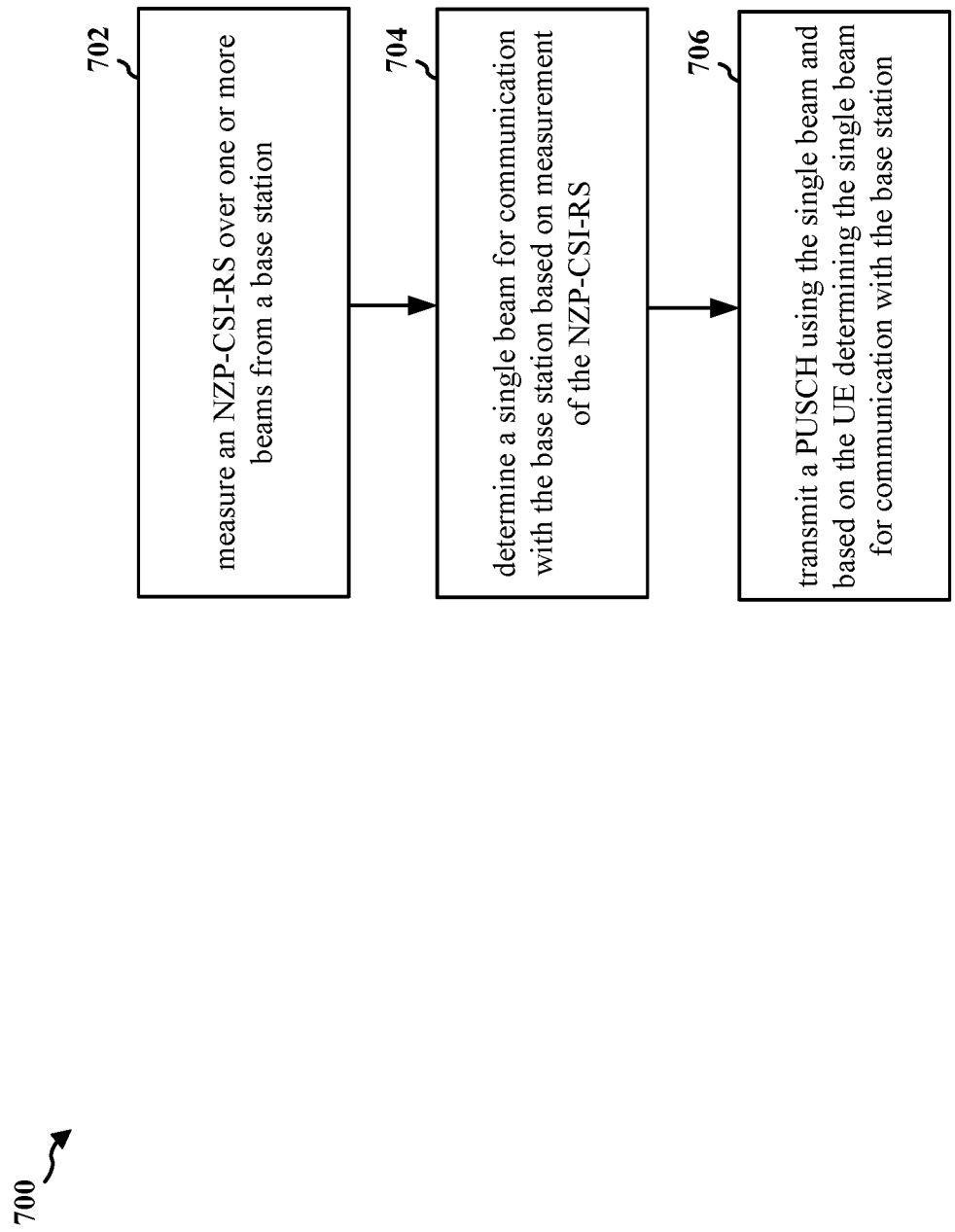
FIG. 7 is a flowchart of a method of wireless communication.

FIG. 7 is a flowchart 700 of a method of wireless communication. The method may be performed by a UE or a component of a UE (e.g., the UE 104, 402, 502, 602; the apparatus 902; the cellular baseband processor 904, which may include the memory 360 and which may be the entire UE 350 or a component of the UE 350, such as the TX processor 368, the RX processor 356, and/or the controller/processor 359). One or more of the illustrated operations may be omitted, transposed, or contemporaneous. The method may configure a UE to reduce a timeline for non-codebook based uplink precoding procedures.

At 702, the UE may measure an NZP-CSI-RS. For example, 702 may be performed by measure component 944 of apparatus 902. The UE may measure the NZP-CSI-RS over one or more beams from the base station. Measurements of the NZP-CSI-RS may indicate that a single beam meets criteria for communication with the base station. In the context of FIG. 6 illustrates, the UE 602, at 612, may measure an NZP-CSI-RS.

At 704, the UE may determine a single beam for communication with the base station. For example, 704 may be performed by determination component 946 of apparatus 902. The UE may determine the single beam for communication with the base station based on measurement of the NZP-CSI-RS. In some aspects, the UE may determine the single beam for a non-codebook based precoder. In the context of FIG. 6, the UE 602, at 614, may determine the single beam for communication with the base station.

At 706, the UE may transmit a PUSCH using the single beam. For example, 706 may be performed by PUSCH component 952 of apparatus 902. The UE may transmit the PUSCH using the single beam to the base station. The UE may transmit the PUSCH using the single beam based on the UE determining the single beam for communication with the base station. In some aspects, the UE may transmit the PUSCH using resources in a CG occasion. In the context of FIG. 6, the UE 602, at 620, may transmit a PUSCH using the single beam.

Figure 8:
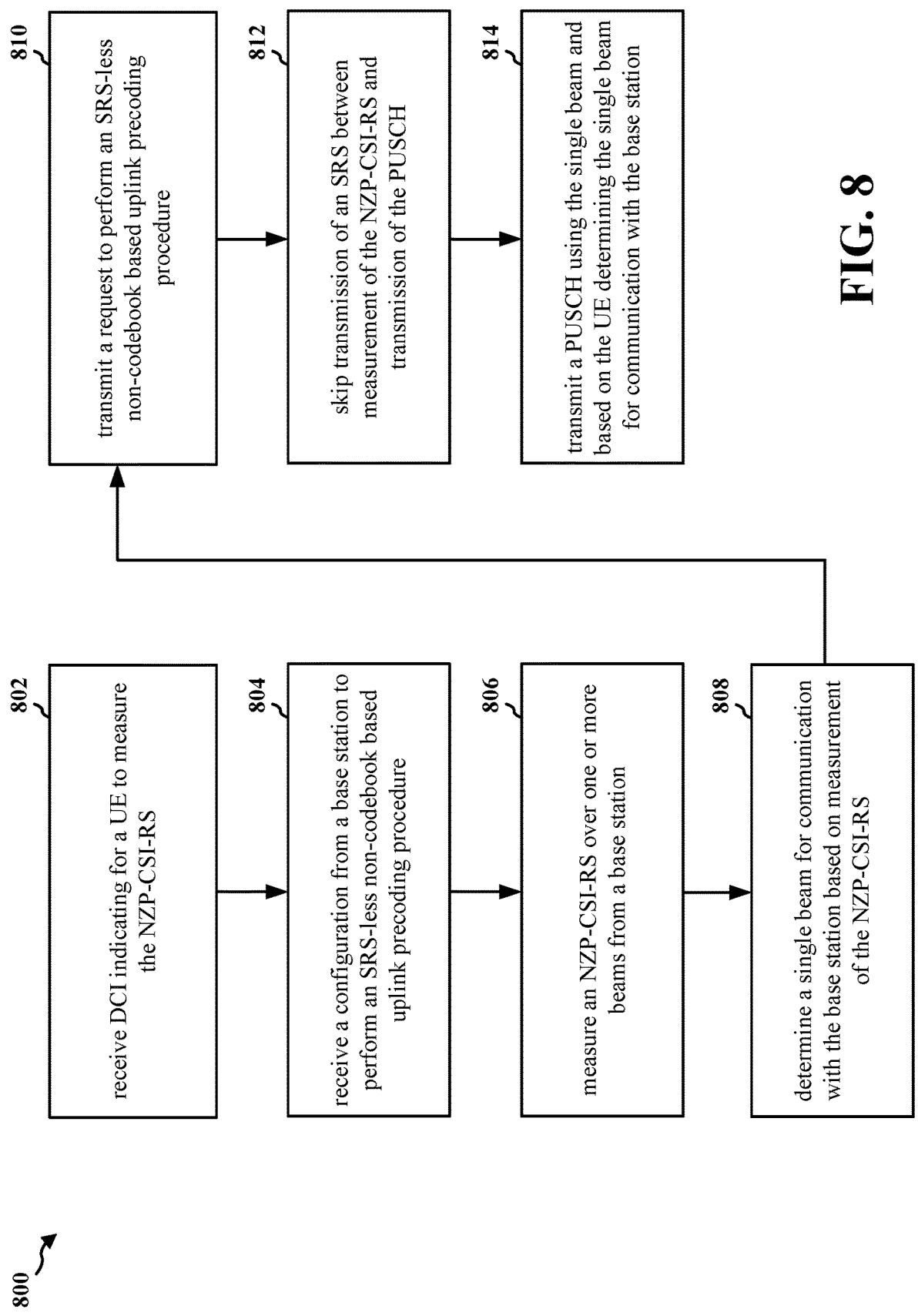
FIG. 8 is a flowchart of a method of wireless communication.

FIG. 8 is a flowchart 800 of a method of wireless communication. The method may be performed by a UE or a component of a UE (e.g., the UE 104, 402, 502, 602; the apparatus 902; the cellular baseband processor 904, which may include the memory 360 and which may be the entire UE 350 or a component of the UE 350, such as the TX processor 368, the RX processor 356, and/or the controller/processor 359). One or more of the illustrated operations may be omitted, transposed, or contemporaneous. The method may configure a UE to reduce a timeline for non-codebook based uplink precoding procedures.

At 802, the UE may receive downlink control information (DCI) indicating for the UE to measure an NZP-CSI-RS, such as described in connection with DCI 506 in FIG. 5 or DCI 606 of FIG. 6. For example, 802 may be performed by DCI component 940 of apparatus 902. The UE may be configured to transmit a PUSCH using resources configured in the DCI.

At 804, the UE may receive a configuration from a base station to perform an SRS-less non-codebook based uplink precoding procedure. For example, 804 may be performed by configuration component 942 of apparatus 902. The UE may transmit the PUSCH using a single beam and without transmitting an SRS further based on the configuration from the base station. In some aspects, the UE may receive a second configuration to apply a non-codebook based uplink precoding procedure with SRS transmission. The UE may receive the second configuration from the base station. In some aspects, the UE may transmit the SRS prior to transmitting the PUSCH based on the second configuration. In the context of FIG. 6, the UE 602, at 608, may receive a configuration to perform an SRS-less non-codebook based uplink precoding procedure.

At 806, the UE may measure an NZP-CSI-RS. For example, 806 may be performed by measure component 944 of apparatus 902. The UE may measure the NZP-CSI-RS over one or more beams from the base station. Measurements of the NZP-CSI-RS may indicate that a single beam meets criteria for communication with the base station. In the context of FIG. 6 illustrates, the UE 602, at 612, may measure an NZP-CSI-RS.

At 808, the UE may determine a single beam for communication with the base station. For example, 808 may be performed by determination component 946 of apparatus 902. The UE may determine the single beam for communication with the base station based on measurement of the NZP-CSI-RS. In some aspects, the UE may determine the single beam for a non-codebook based precoder. In the context of FIG. 6, the UE 602, at 614, may determine the single beam for communication with the base station.

In some aspects, if the UE identifies multiple potential beams based on the NZP-CSI-RS, the UE may transmit an SRS using the multiple potential beams. The UE may receive an SRI from the base station indicating one or more beams. The UE may transmit the PUSCH to the base station using the one or more beams indicated in the SRI.

At 810, the UE may transmit a request to perform an SRS-less non-codebook based uplink precoding procedure. For example, 810 may be performed by request component 948 of apparatus 902. The UE may transmit the request to perform the SRS-less non-codebook based uplink precoding procedure to the base station. The UE may transmit the PUSCH using the single beam and without transmitting an SRS further based on the request. In some aspects, the UE may transmit a second request to apply a non-codebook based uplink precoding procedure with SRS transmission. The UE may transmit the second request to the base station. In some aspects, the UE may transmit the SRS prior to transmitting the PUSCH after sending the second request. In the context of FIG. 6, the UE 602, at 618, may transmit a request to perform an SRS-less non-codebook based uplink precoding procedure.

In some aspects, for example at 812, the UE may skip transmission of the SRS. For example, 812 may be performed by skip component 950 of apparatus 902. The UE may skip transmission of the SRS between measurement of the NZP-CSI-RS and transmission of the PUSCH. The SRS transmission may comprise periodic SRS, aperiodic SRS, or semi-persistent SRS. The UE skipping the transmission of the SRS may shorten the non-codebook based uplink precoding procedure, which may also reduce uplink and/or downlink transmissions as well as reduce power consumption at the UE. In some aspects, the UE may transmit the PUSCH using the single beam without reception of downlink control information with an SRI from the base station. In the context of FIG. 5 the UE 502, at 516, may skip the transmission of the SRS.

At 814, the UE may transmit a PUSCH using the single beam. For example, 814 may be performed by PUSCH component 952 of apparatus 902. The UE may transmit the PUSCH using the single beam to the base station. The UE may transmit the PUSCH using the single beam based on the UE determining the single beam for communication with the base station. In some aspects, the UE may transmit the PUSCH using resources in a CG occasion. In the context of FIG. 6, the UE 602, at 620, may transmit a PUSCH using the single beam.

Figure 9:
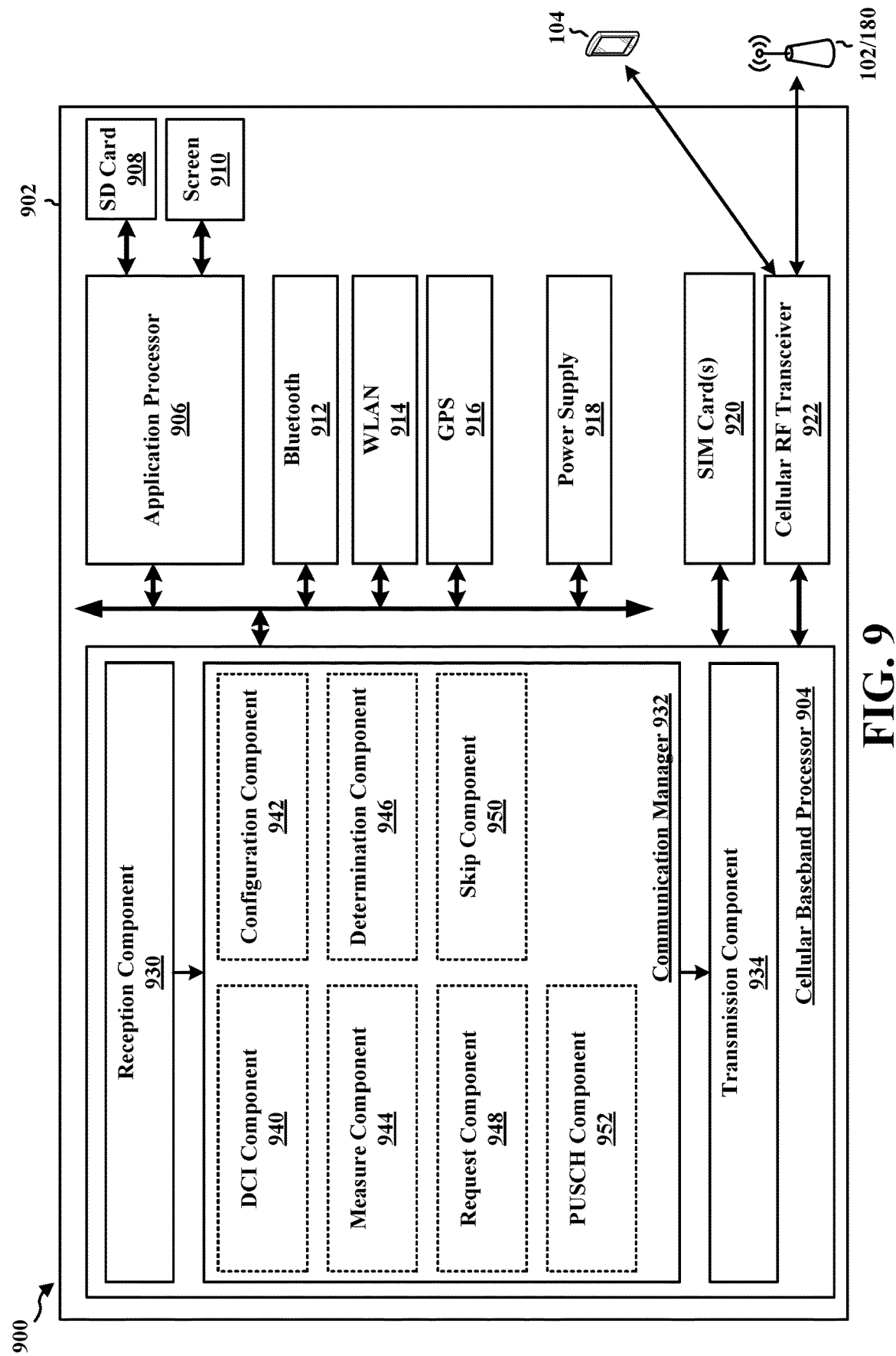
FIG. 9 is a diagram illustrating an example of a hardware implementation for an example apparatus.

FIG. 9 is a diagram 900 illustrating an example of a hardware implementation for an apparatus 902. The apparatus 902 may be a UE, a component of a UE, or may implement UE functionality. In some aspects, the apparatus 902 may include a cellular baseband processor 904 (also referred to as a modem) coupled to a cellular RF transceiver 922. In some aspects, the apparatus 902 may further include one or more subscriber identity modules (SIM) cards 920, an application processor 906 coupled to a secure digital (SD) card 908 and a screen 910, a Bluetooth module 912, a wireless local area network (WLAN) module 914, a Global Positioning System (GPS) module 916, or a power supply 918. The cellular baseband processor 904 communicates through the cellular RF transceiver 922 with the UE 104 and/or BS 102/180. The cellular baseband processor 904 may include a computer-readable medium/memory. The computer-readable medium/memory may be non-transitory. The cellular baseband processor 904 is responsible for general processing, including the execution of software stored on the computer-readable medium/memory. The software, when executed by the cellular baseband processor 904, causes the cellular baseband processor 904 to perform the various functions described supra. The computer-readable medium/memory may also be used for storing data that is manipulated by the cellular baseband processor 904 when executing software. The cellular baseband processor 904 further includes a reception component 930, a communication manager 932, and a transmission component 934. The communication manager 932 includes the one or more illustrated components. The components within the communication manager 932 may be stored in the computer-readable medium/memory and/or configured as hardware within the cellular baseband processor 904. The cellular baseband processor 904 may be a component of the UE 350 and may include the memory 360 and/or at least one of the TX processor 368, the RX processor 356, and the controller/processor 359. In one configuration, the apparatus 902 may be a modem chip and include just the baseband processor 904, and in another configuration, the apparatus 902 may be the entire UE (e.g., see 350 of FIG. 3) and include the additional modules of the apparatus 902.

The communication manager 932 includes a DCI component 940 that is configured to receive DCI indicating for the UE to measure an NZP-CSI-RS, e.g., as described in connection with 802 of FIG. 8. The communication manager 932 further includes a configuration component 942 that is configured to receive a configuration from a base station to perform an SRS-less non-codebook based uplink precoding procedure, e.g., as described in connection with 804 of FIG. 8. The communication manager 932 further includes a measure component 944 that is configured to measure an NZP-CSI-RS, e.g., as described in connection with 702 of FIG. 7 or 806 of FIG. 8. The communication manager 932 further includes a determination component 946 that is configured to determine the single beam for communication with the base station, e.g., as described in connection with 704 of FIG. 7 or 808 of FIG. 8. The communication manager 932 further includes a request component 948 that is configured to transmit a request to perform an SRS-less non-codebook based uplink precoding procedure, e.g., as described in connection with 810 of FIG. 8. The communication manager 932 further includes a skip component 950 that is configured to skip transmission of the SRS, e.g., as described in connection with 812 of FIG. 8. The communication manager 932 further includes a PUSCH component 952 that is configured to transmit a PUSCH using the single beam, e.g., as described in connection with 706 of FIG. 7 or 814 of FIG. 8.

The apparatus may include additional components that perform each of the blocks of the algorithm in the flowcharts of FIG. 7 or 8. As such, each block in the flowcharts of FIG. 7 or 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 902 may include a variety of components configured for various functions. In one configuration, the apparatus 902, and in particular the cellular baseband processor 904, includes means for measuring an NZP-CSI-RS over one or more beams from a base station. The apparatus includes means for determining a single beam for communication with the base station based on measurement of the NZP-CSI-RS. The apparatus includes means for transmitting a PUSCH using the single beam and based on the UE determining the single beam for communication with the base station. The apparatus further includes means for skipping transmission of an SRS between measurement of the NZP-CSI-RS and transmission of the PUSCH. The apparatus further includes means for transmitting a SRS using the multiple potential beams. The apparatus further includes means for receiving a SRI from the base station from the base station indicating one or more beams. The apparatus further includes means for transmitting the PUSCH to the base station using the one or more beams indicated in the SRI. The apparatus further includes means for receiving DCI indicating for the UE to measure the NZP-CSI-RS. The UE transmits the PUSCH using resources configured in the DCI. The apparatus further includes means for receiving a configuration from the base station to perform an SRS-less non-codebook based uplink precoding procedure. The UE transmits the PUSCH using the single beam and without transmitting an SRS further based on the configuration from the base station. The apparatus further includes means for receiving a second configuration to apply a non-codebook based uplink precoding procedure with SRS transmission. The apparatus further includes means for transmitting the SRS prior to transmitting the PUSCH based on the second configuration. The apparatus further includes means for transmitting a request to perform an SRS-less non-codebook based uplink precoding procedure. The UE transmits the PUSCH using the single beam and without transmitting an SRS further based on the request. The apparatus further includes means for transmitting a second request to apply a non-codebook based uplink precoding procedure with SRS transmission. The apparatus further includes means for transmitting the SRS prior to transmitting the PUSCH after sending the second request. The means may be one or more of the components of the apparatus 902 configured to perform the functions recited by the means. As described supra, the apparatus 902 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 10:
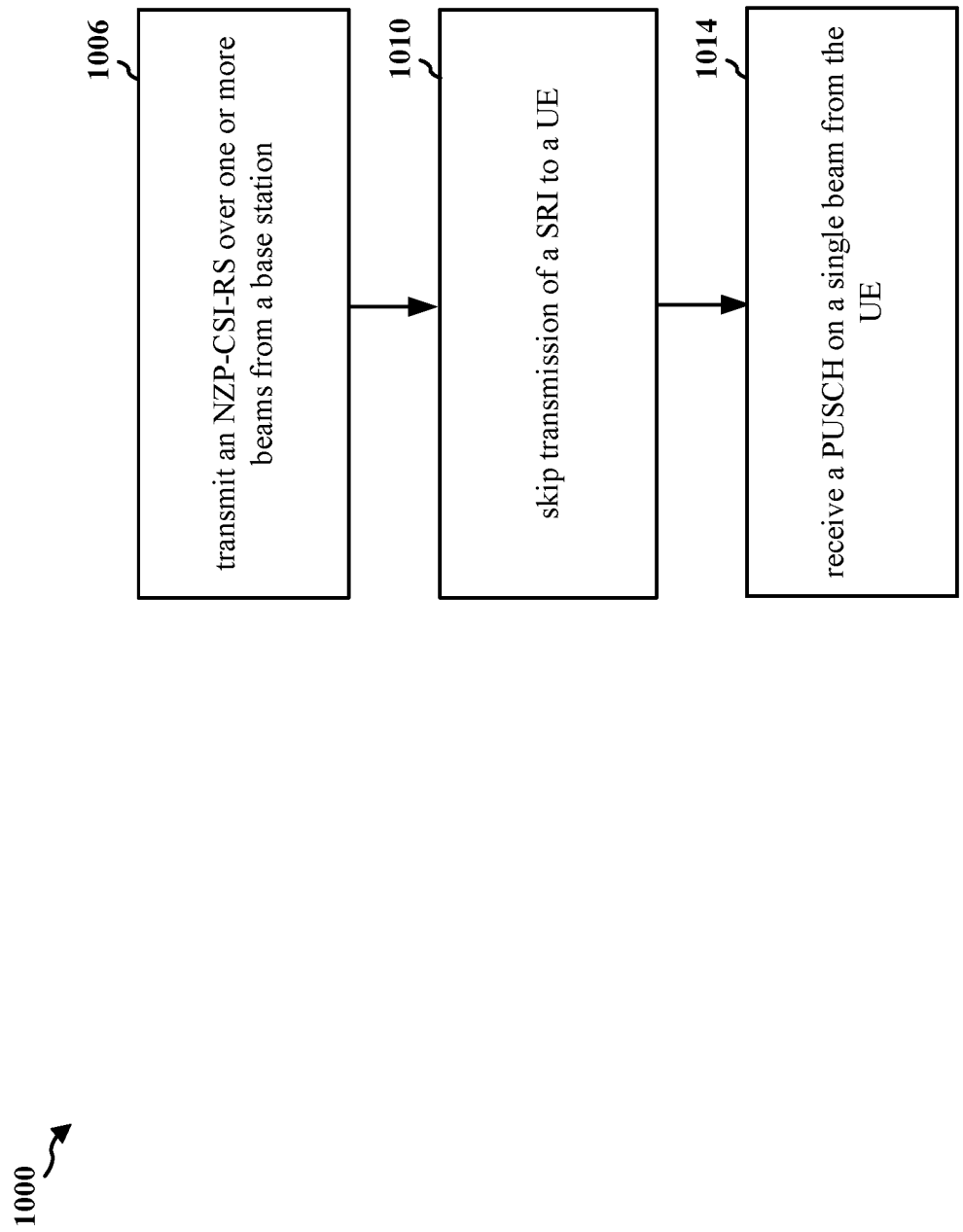
FIG. 10 is a flowchart of a method of wireless communication.

FIG. 10 is a flowchart 1000 of a method of wireless communication. The method may be performed by a base station or a component of a base station (e.g., the base station 102/180, 404, 504, 604; the apparatus 1202; the baseband unit 1204, which may include the memory 376 and which may be the entire base station 310 or a component of the base station 310, such as the TX processor 316, the RX processor 370, and/or the controller/processor 375). One or more of the illustrated operations may be omitted, transposed, or contemporaneous. The method may allow a base station to configure a UE to reduce a timeline for non-codebook based uplink precoding procedures.

At 1002, the base station may transmit the NZP-CSI-RS. For example, 1002 may be performed by NZP-CSI-RS component 1244 of apparatus 1202. The base station may transmit the NZP-CSI-RS to a UE. The base station may transmit the NZP-CSI-RS over one or more beams from the base station. In the context of FIG. 6, the base station 604, at 610, may transmit a NZP-CSI-RS.

At 1004, the base station may skip transmission of an SRI. For example, 1004 may be performed by skip component 1248 of apparatus 1202. The base station may skip transmission of the SRI to the UE. FIG. 6 illustrates an example of a base station 604 skipping, at 616, the transmission of an SRI. In the context of FIG. 5, the base station 504, at 518, may skip the transmission of a DCI with SRI. In the context of FIG. 6, the base station 604, at 616, may skip the transmission of an SRI.

At 1006, the base station may receive the PUSCH on a single beam from the UE. For example, 1006 may be performed by PUSCH component 1252 of apparatus 1202. The PUSCH may be received based on a non-codebook based precoder. In some aspects, the base station may receive the PUSCH using resources in a CG occasion for the UE. In the context of FIG. 6, the base station 604, at 620, may receive a PUSCH on a single beam from a UE 602.

Figure 11:
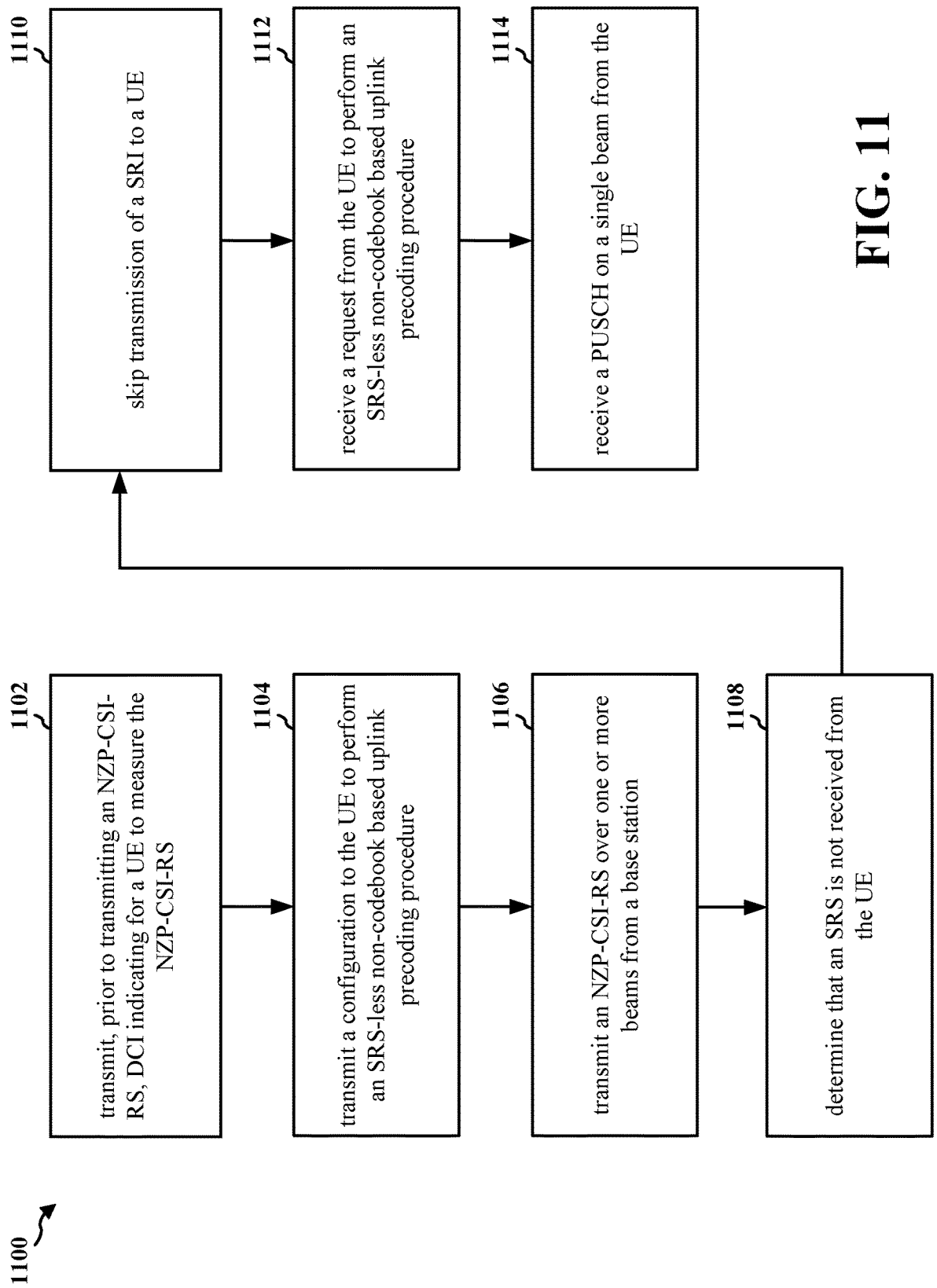
FIG. 11 is a flowchart of a method of wireless communication.

FIG. 11 is a flowchart 1100 of a method of wireless communication. The method may be performed by a base station or a component of a base station (e.g., the base station 102/180, 404, 504, 604; the apparatus 1202; the baseband unit 1204, which may include the memory 376 and which may be the entire base station 310 or a component of the base station 310, such as the TX processor 316, the RX processor 370, and/or the controller/processor 375). One or more of the illustrated operations may be omitted, transposed, or contemporaneous. The method may allow a base station to configure a UE to reduce a timeline for non-codebook based uplink precoding procedures.

At 1102, the base station may transmit DCI indicating the UE to measure an NZP-CSI-RS, such as described in connection with DCI 506 in FIG. 5 or DCI 606 of FIG. 6. For example, 1102 may be performed by DCI component 1240 of apparatus 1202. The base station may transmit the DCI indicating the UE to measure the NZP-CSI-RS prior to transmitting the NZP-CSI-RS. The base station may receive a PUSCH using resources configured in the DCI.

At 1104, the base station may transmit a configuration to perform an SRS-less non-codebook based uplink precoding procedure. For example, 1104 may be performed by configuration component 1242 of apparatus 1202. The base station may transmit the configuration to perform the SRS-less non-codebook based uplink precoding procedure to a UE. The base station may receive the PUSCH using a single beam and without receiving an SRS based on the configuration. In some aspects, the base station may transmit a second configuration for the UE to apply a non-codebook based uplink precoding procedure with SRS transmission. In some aspects, the base station may monitor for the SRS from the UE prior to receiving the PUSCH based on the second configuration. In the context of FIG. 6, the base station 604, 608, may transmit a configuration to a UE 602 to perform an SRS-less non-codebook based uplink precoding procedure.

At 1106, the base station may transmit the NZP-CSI-RS. For example, 1106 may be performed by NZP-CSI-RS component 1244 of apparatus 1202. The base station may transmit the NZP-CSI-RS over one or more beams from the base station. In the context of FIG. 6, the base station 604, at 610, may transmit a NZP-CSI-RS.

At 1108, the base station may determine that an SRS is not received from the UE. For example, 1108 may be performed by determination component 1246 of apparatus 1202. The base station may skip the transmission of the SRI based on determining that the SRS is not received from the UE. FIG. 5 illustrates an example of a base station 504 skipping the transmission of DCI having SRI, at 518, based on the determination that SRS was not received, at 520, and does not decide a precoder.

At 1110, the base station may skip transmission of an SRI. For example, 1110 may be performed by skip component 1248 of apparatus 1202. The base station may skip transmission of the SRI to the UE. FIG. 5 illustrates an example of a base station 504 skipping the transmission of a DCI with SRI, at 518. In the context of FIG. 6, the base station 604, at 616, may skip the transmission of an SRI.

At 1112, the base station may receive a request to perform an SRS-less non-codebook based uplink precoding procedure. For example, 1112 may be performed by request component 1250 of apparatus 1202. The base station may receive the request to perform the SRS-less non-codebook based uplink precoding procedure from the UE. The base station may receive the PUSCH using the single beam and without monitoring for an SRS based on the request. In some aspects, the base station may receive a second request from the UE to apply a non-codebook based uplink precoding procedure with SRS transmission. In some aspects, the base station may monitor for the SRS prior to receiving the PUSCH based on the second request. In the context of FIG. 6, the base station 604, at 618, may receive a request from the UE 602 to perform an SRS-less non-codebook based uplink precoding procedure.

At 1114, the base station may receive the PUSCH on a single beam from the UE. For example, 1114 may be performed by PUSCH component 1252 of apparatus 1202. The PUSCH may be received based on a non-codebook based precoder. In some aspects, the base station may receive the PUSCH using resources in a CG occasion for the UE. In the context of FIG. 6, the base station 604, at 620, may receive a PUSCH on a single beam from the UE 602.

Figure 12:
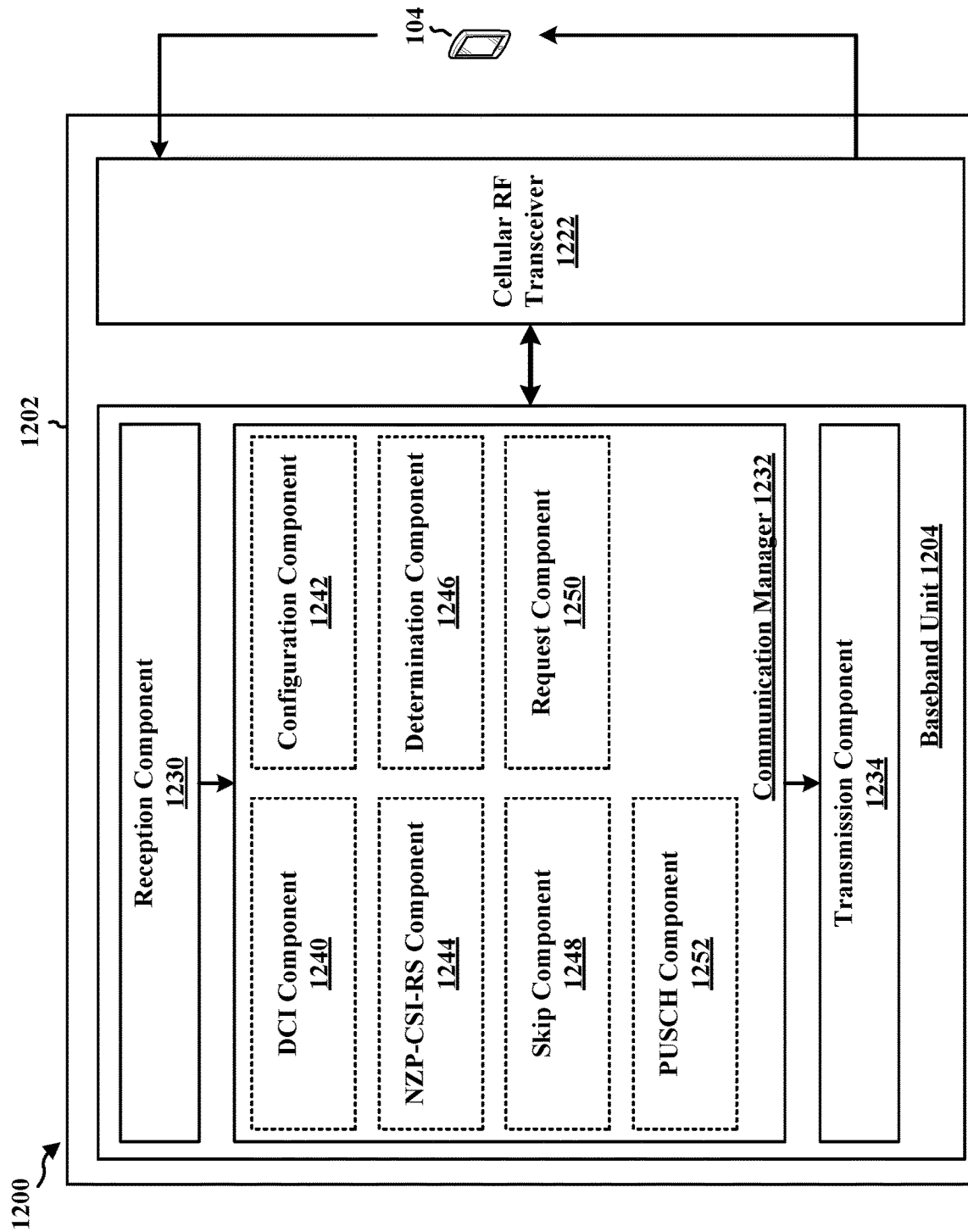
FIG. 12 is a diagram illustrating an example of a hardware implementation for an example apparatus.

FIG. 12 is a diagram 1200 illustrating an example of a hardware implementation for an apparatus 1202. The apparatus 1202 may be a base station, a component of a base station, or may implement base station functionality. In some aspects, the apparatus 1202 may include a baseband unit 1204. The baseband unit 1204 may communicate through a cellular RF transceiver 1222 with the UE 104. The baseband unit 1204 may include a computer-readable medium/memory. The baseband unit 1204 is responsible for general processing, including the execution of software stored on the computer-readable medium/memory. The software, when executed by the baseband unit 1204, causes the baseband unit 1204 to perform the various functions described supra. The computer-readable medium/memory may also be used for storing data that is manipulated by the baseband unit 1204 when executing software. The baseband unit 1204 further includes a reception component 1230, a communication manager 1232, and a transmission component 1234. The communication manager 1232 includes the one or more illustrated components. The components within the communication manager 1232 may be stored in the computer-readable medium/memory and/or configured as hardware within the baseband unit 1204. The baseband unit 1204 may be a component of the base station 310 and may include the memory 376 and/or at least one of the TX processor 316, the RX processor 370, and the controller/processor 375.

The communication manager 1232 includes a DCI component 1240 that may transmit DCI indicating the UE to measure an NZP-CSI-RS, e.g., as described in connection with 1102 of FIG. 11. The communication manager 1232 further includes a configuration component 1242 that may transmit a configuration to perform an SRS-less non-codebook based uplink precoding procedure, e.g., as described in connection with 1104 of FIG. 11. The communication manager 1232 further includes an NZP-CSI-RS component 1244 that may transmit the NZP-CSI-RS, e.g., as described in connection with 1002 of FIG. 10 or 1106 of FIG. 11. The communication manager 1232 further includes a determination component 1246 that may determine that an SRS is not received from the UE, e.g., as described in connection with 1108 of FIG. 11. The communication manager 1232 further includes a skip component 1248 that may skip transmission of an SRI, e.g., as described in connection with 1004 of FIG. 10 or 1110 of FIG. 11. The communication manager 1232 further includes a request component 1250 that may receive a request to perform an SRS-less non-codebook based uplink precoding procedure, e.g., as described in connection with 1112 of FIG. 11. The communication manager 1232 further includes a PUSCH component 1252 that may receive the PUSCH on a single beam from the UE, e.g., as described in connection with 1006 of FIG. 10 or 1114 of FIG. 11.

The apparatus may include additional components that perform each of the blocks of the algorithm in the flowcharts of FIG. 10 or 11. As such, each block in the flowcharts of FIG. 10 or 11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1202 may include a variety of components configured for various functions. In one configuration, the apparatus 1202, and in particular the baseband unit 1204, includes means for transmitting an NZP-CSI-RS over one or more beams from a base station. The apparatus includes means for skipping transmission of an SRI to a UE. The apparatus includes means for receiving a PUSCH on a single beam from the UE. The apparatus further includes means for determining that an SRS is not received from the UE. The base station skips the transmission of the SRI based on determining that the SRS is not received from the UE. The apparatus further includes means for transmitting, prior to transmitting the NZP-CSI-RS, DCI indicating for the UE to measure the NZP-CSI-RS. The base station receives the PUSCH using resources configured in the DCI. The apparatus further includes means for transmitting a configuration to the UE to perform an SRS-less non-codebook based uplink precoding procedure. The base station receives the PUSCH using the single beam and without receiving an SRS based on the configuration. The apparatus further includes means for transmitting a second configuration the UE to apply a non-codebook based uplink precoding procedure with SRS transmission. The apparatus further includes means for monitoring for the SRS from the UE prior to receiving the PUSCH based on the second configuration. The apparatus further includes means for receiving a request from the UE to perform an SRS-less non-codebook based uplink precoding procedure. The base station receives the PUSCH using the single beam and without monitoring for an SRS based on the request. The apparatus further includes means for receiving a second request from the UE to apply a non-codebook based uplink precoding procedure with SRS transmission. The apparatus further includes means for monitoring for the SRS prior to receiving the PUSCH based on the second request. The means may be one or more of the components of the apparatus 1202 configured to perform the functions recited by the means. As described supra, the apparatus 1202 may include the TX Processor 316, the RX Processor 370, and the controller/processor 375. As such, in one configuration, the means may be the TX Processor 316, the RX Processor 370, and the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a UE including at least one processor coupled to a memory and configured to measure an NZP-CSI-RS over one or more beams from a base station; determine a single beam for communication with the base station based on measurement of the NZP-CSI-RS; and transmit a PUSCH using the single beam and based on the UE determining the single beam for communication with the base station.

Aspect 2 is the apparatus of Aspect 1, further includes a transceiver coupled to the at least one processor.

Aspect 3 is the apparatus of Aspects 1 and 2, further includes that the at least one processor is further configured to skip transmission of a SRS between measurement of the NZP-CSI-RS and transmission of the PUSCH.

Aspect 4 is the apparatus of Aspects 1-3, further includes that the UE transmits the PUSCH using the single beam without reception of downlink control information with an SRI from the base station.

Aspect 5 is the apparatus of Aspects 1-4, further includes that the UE determines the single beam for a non-codebook based precoder.

Aspect 6 is the apparatus of Aspects 1-5, further includes that measurements of the NZP-CSI-RS indicate that a single beam meets criteria for communication with the base station.

Aspect 7 is the apparatus of Aspects 1-6, further includes that if the UE identifies multiple potential beams based on the NZP-CSI-RS, the at least one processor is further configured to transmit a SRS using the multiple potential beams; receive an SRI from the base station from the base station indicating one or more beams; and transmit the PUSCH to the base station using the one or more beams indicated in the SRI.

Aspect 8 is the apparatus of Aspects 1-7, further includes that the at least one processor is further configured to receive downlink control information (DCI) indicating for the UE to measure the NZP-CSI-RS, wherein the UE transmits the PUSCH using resources configured in the DCI.

Aspect 9 is the apparatus of Aspects 1-8, further includes that the UE transmits the PUSCH using resources in a CG occasion.

Aspect 10 is the apparatus of Aspects 1-9, further includes that the at least one processor is further configured to receive a configuration from the base station to perform an SRS-less non-codebook based uplink precoding procedure, and wherein the UE transmits the PUSCH using the single beam and without transmitting an SRS further based on the configuration from the base station.

Aspect 11 is the apparatus of Aspects 1-10, further includes that the at least one processor is further configured to receive a second configuration to apply a non-codebook based uplink precoding procedure with SRS transmission; and transmit the SRS prior to transmitting the PUSCH based on the second configuration.

Aspect 12 is the apparatus of Aspects 1-11, further includes that the at least one processor is further configured to transmit a request to perform an SRS-less non-codebook based uplink precoding procedure, and wherein the UE transmits the PUSCH using the single beam and without transmitting an SRS further based on the request.

Aspect 13 is the apparatus of Aspects 1-12, further includes that the at least one processor is further configured to transmit a second request to apply a non-codebook based uplink precoding procedure with SRS transmission; and transmit the SRS prior to transmitting the PUSCH after sending the second request.

Aspect 14 is a method of wireless communication for implementing any of Aspects 1-13.

Aspect 15 is an apparatus for wireless communication including means for implementing any of Aspects 1-13.

Aspect 16 is a computer-readable medium storing computer executable code, where the code when executed by a processor causes the processor to implement any of Aspects 1-13.

Aspect 17 is an apparatus for wireless communication at a base station including at least one processor coupled to a memory and configured to transmit an NZP-CSI-RS over one or more beams from a base station; skip transmission of an SRI to a UE; and receive a PUSCH on a single beam from the UE.

Aspect 18 is the apparatus of Aspect 17, further includes a transceiver coupled to the at least one processor.

Aspect 19 is the apparatus of Aspects 17 and 18, further includes that the at least one processor is further configured to determine that an SRS is not received from the UE, wherein the base station skips the transmission of the SRI based on determining that the SRS is not received from the UE.

Aspect 20 is the apparatus of Aspects 17-19, further includes that the PUSCH is received based on a non-codebook based precoder.

Aspect 21 is the apparatus of Aspects 17-20, further includes that the at least one processor is further configured to transmit, prior to transmitting the NZP-CSI-RS, DCI indicating for the UE to measure the NZP-CSI-RS, wherein the base station receives the PUSCH using resources configured in the DCI.

Aspect 22 is the apparatus of Aspects 17-21, further includes that the base station receives the PUSCH using resources in a CG occasion for the UE.

Aspect 23 is the apparatus of Aspects 17-22, further includes that the at least one processor is further configured to transmit a configuration to the UE to perform an SRS-less non-codebook based uplink precoding procedure, and wherein the base station receives the PUSCH using the single beam and without receiving an SRS based on the configuration.

Aspect 24 is the apparatus of Aspects 17-23, further includes that the at least one processor is further configured to transmit a second configuration the UE to apply a non-codebook based uplink precoding procedure with SRS transmission; and monitor for the SRS from the UE prior to receiving the PUSCH based on the second configuration.

Aspect 25 is the apparatus of Aspects 17-24, further includes that the at least one processor is further configured to receive a request from the UE to perform an SRS-less non-codebook based uplink precoding procedure, and wherein the base station receives the PUSCH using the single beam and without monitoring for an SRS based on the request.

Aspect 26 is the apparatus of Aspects 17-25, further includes that the at least one processor is further configured to receive a second request from the UE to apply a non-codebook based uplink precoding procedure with SRS transmission; and monitor for the SRS prior to receiving the PUSCH based on the second request.

Aspect 27 is a method of wireless communication for implementing any of Aspects 17-26.

Aspect 28 is an apparatus for wireless communication including means for implementing any of Aspects 17-26.

Aspect 29 is a computer-readable medium storing computer executable code, where the code when executed by a processor causes the processor to implement any of Aspects 17-26.

What is claimed is:

1. An apparatus for wireless communication at a user equipment (UE), comprising:
   a memory; and
   at least one processor coupled to the memory and configured to:
      measure a non-zero-power channel state information reference signal (NZP-CSI-RS) over one or more beams from a base station;
      determine a single beam for communication with the base station based on measurement of the NZP-CSI-RS;
      skip transmission of a sounding reference signal (SRS) in response to a determination of the single beam; and
      transmit a physical uplink shared channel (PUSCH) using the single beam and based on the determination of the single beam for communication with the base station.

2. The apparatus of claim 1, further comprising a transceiver coupled to the at least one processor.

3. The apparatus of claim 1, wherein the at least one processor is further configured to:
   skip the transmission of the SRS between the measurement of the NZP-CSI-RS and transmission of the PUSCH.

4. The apparatus of claim 3, wherein the at least one processor is configured to transmit the PUSCH via the single beam without reception of downlink control information with a scheduling request indicator (SRI) from the base station.

5. The apparatus of claim 1, wherein the at least one processor is configured to determine the single beam for a non-codebook based precoder.

6. The apparatus of claim 1, wherein measurements of the NZP-CSI-RS indicate that the single beam meets criteria for communication with the base station.

7. The apparatus of claim 1, wherein upon identification of multiple potential beams based on the NZP-CSI-RS, the at least one processor is further configured to:
   transmit the SRS using the multiple potential beams;
   receive a scheduling request indicator (SRI) from the base station from the base station indicating one or more beams; and
   transmit the PUSCH to the base station using the one or more beams indicated in the SRI.

8. The apparatus of claim 1, wherein the at least one processor is further configured to:
   receive downlink control information (DCI) that indicates to measure the NZP-CSI-RS, and transmit the PUSCH using resources configured in the DCI.

9. The apparatus of claim 1, wherein the at least one processor is configured to transmit the PUSCH via resources in a configured grant (CG) occasion.

10. The apparatus of claim 1, wherein the at least one processor is further configured to:
    receive a configuration from the base station to perform a SRS-less non-codebook based uplink precoding procedure, and transmit the PUSCH via the single beam and without transmission of the SRS further based on the configuration from the base station.

11. The apparatus of claim 10, wherein the at least one processor is further configured to:
    receive a second configuration to apply a non-codebook based uplink precoding procedure with SRS transmission; and
    transmit the SRS prior to transmission of the PUSCH based on the second configuration.

12. The apparatus of claim 1, wherein the at least one processor is further configured to:
    transmit a request to perform a SRS-less non-codebook based uplink precoding procedure, and transmit the PUSCH via the single beam and without transmission of the SRS further based on the request.

13. The apparatus of claim 12, wherein the at least one processor is further configured to:
    transmit a second request to apply a non-codebook based uplink precoding procedure with SRS transmission; and
    transmit the SRS prior to transmission of the PUSCH after transmission of the second request.

14. A method of wireless communication at a user equipment (UE), comprising:
    measuring a non-zero-power channel state information reference signal (NZP-CSI-RS) over one or more beams from a base station;
    determining a single beam for communication with the base station based on measurement of the NZP-CSI-RS;
    skipping transmission of a sounding reference signal (SRS) in response to the UE determining the single beam; and
    transmitting a physical uplink shared channel (PUSCH) using the single beam and based on the UE determining the single beam for communication with the base station.

15. The method of claim 14, further comprising:
    skipping the transmission of the SRS between the measurement of the NZP-CSI-RS and transmission of the PUSCH.

16. The method of claim 14, wherein if the UE identifies multiple potential beams based on the NZP-CSI-RS, the method further comprises:
    transmitting the SRS using the multiple potential beams;
    receiving a scheduling request indicator (SRI) from the base station from the base station indicating one or more beams; and
    transmitting the PUSCH to the base station using the one or more beams indicated in the SRI.

17. The method of claim 14, further comprising:
    receiving downlink control information (DCI) indicating for the UE to measure the NZP-CSI-RS, wherein the UE transmits the PUSCH using resources configured in the DCI.

18. An apparatus for wireless communication at a base station, comprising:
    a memory; and at least one processor coupled to the memory and configured to:
- transmit a non-zero-power channel state information reference signal (NZP-CSI-RS) over one or more beams from the base station;
- skip transmission of a scheduling request indicator (SRI) to a user equipment (UE) in response to a determination of a lack of reception of a sounding reference signal (SRS) in response to transmission of the NZP-CSI-RS; and
- receive a physical uplink shared channel (PUSCH) on a single beam from the UE.

19. The apparatus of claim 18, further comprising a transceiver coupled to the at least one processor.

20. The apparatus of claim 18, wherein the at least one processor is further configured to:
- determine a lack of reception of the SRS from the UE, and skip the transmission of the SRI based on a determination of the lack of the reception of the SRS from the UE.

21. The apparatus of claim 18, wherein reception of the PUSCH is based on a non-codebook based precoder.

22. The apparatus of claim 18, wherein the at least one processor is further configured to:
- transmit, prior to the transmission of the NZP-CSI-RS, downlink control information (DCI) that indicates for the UE to measure the NZP-CSI-RS, and receive the PUSCH based on resources configured in the DCI.

23. The apparatus of claim 18, wherein the at least one processor is configured to receive the PUSCH based on resources in a configured grant (CG) occasion for the UE.

24. The apparatus of claim 18, wherein the at least one processor is further configured to:
- transmit a configuration to the UE to perform a SRS-less non-codebook based uplink precoding procedure, and receive the PUSCH based on the single beam and without reception of the SRS based on the configuration.

25. The apparatus of claim 24, wherein the at least one processor is further configured to:
- transmit a second configuration the UE to apply a non-codebook based uplink precoding procedure with SRS transmission; and
- monitor for the SRS from the UE prior to reception of the PUSCH based on the second configuration.

26. The apparatus of claim 18, wherein the at least one processor is further configured to:
- receive a request from the UE to perform a SRS-less non-codebook based uplink precoding procedure, and receive the PUSCH based on the single beam and without a monitor for the SRS based on the request.

27. The apparatus of claim 26, wherein the at least one processor is further configured to:
- receive a second request from the UE to apply a non-codebook based uplink precoding procedure with SRS transmission; and
- monitor for the SRS prior to reception of the PUSCH based on the second request.

28. A method of wireless communication at a base station, comprising:
- transmitting a non-zero-power channel state information reference signal (NZP-CSI-RS) over one or more beams from the base station;
- skipping transmission of a scheduling request indicator (SRI) to a user equipment (UE), wherein the transmission of the SRI is skipped in response to a determination that a sounding reference signal (SRS) is not received in response to transmission of the NZP-CSI-RS; and
- receiving a physical uplink shared channel (PUSCH) on a single beam from the UE.

29. The method of claim 28, further comprising:
- determining that the SRS is not received from the UE, wherein the base station skips the transmission of the SRI based on determining that the SRS is not received from the UE.

30. The method of claim 28, further comprising:
- transmitting a configuration to the UE to perform a SRS-less non-codebook based uplink precoding procedure, and wherein the base station receives the PUSCH using the single beam and without receiving the SRS based on the configuration.

* * * * *